O. HOFFMANN.
BALL BEARING.
APPLICATION FILED DEC. 23, 1912.

1,071,317. Patented Aug. 26, 1913.

Witnesses:
Henry Eckert
Martin Fitzgerald

Inventor:
Oscar Hoffmann
by E. Croydon Marks
Attorney

UNITED STATES PATENT OFFICE.

OSCAR HOFFMANN, OF WILLICH, GERMANY, ASSIGNOR TO STAHLWERK BECKER AKTIENGESELLSCHAFT, OF WILLICH, GERMANY.

BALL-BEARING.

1,071,317.  Specification of Letters Patent.  Patented Aug. 26, 1913.

Application filed December 23, 1912. Serial No. 738,169.

*To all whom it may concern:*

Be it known that I, OSCAR HOFFMANN, a subject of the King of Prussia, and resident of 7 Moltkestrasse, Willich, in the Province of the Rhine, German Empire, have invented certain new and useful Improvements in Ball-Bearings, of which the following is a specification.

This invention relates to ball bearings of the type in which the two race-rings are each provided with two projecting ribs on their inner opposing face adapted to constitute the ball race, and the object of the present invention is to provide an improved method of inserting the balls in position in bearings of this type without the provision of notches or the like in the ribs and without damaging the ribs.

According to the present invention an annular wedge or ring of triangular cross section is inserted in one of the ball rings so as to rest upon the upper projecting rib thereof and thus constitute a gradient surface over which the balls may be rolled under pressure.

In order that this invention may be more clearly understood, reference is made to the accompanying drawings, which show by way of example, the preferred construction of the improved ball bearing.

Figure 1:
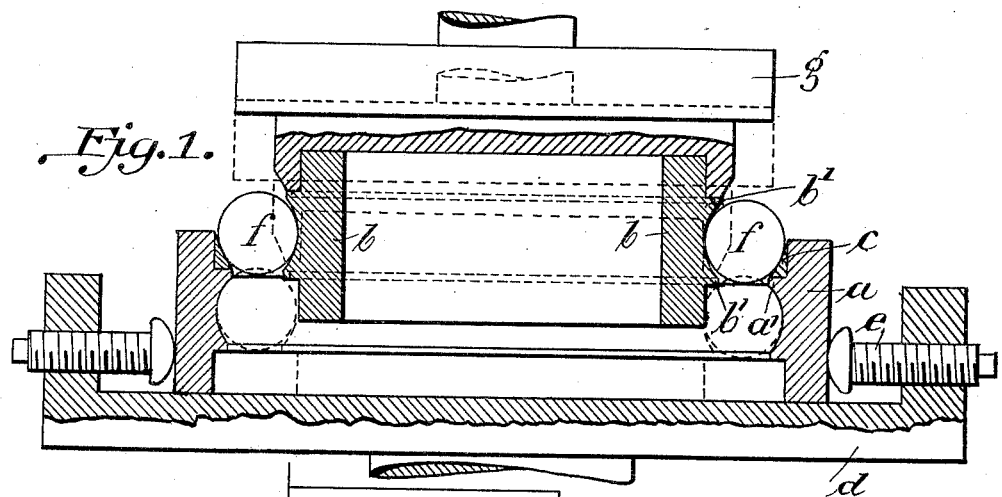
Figure 2:
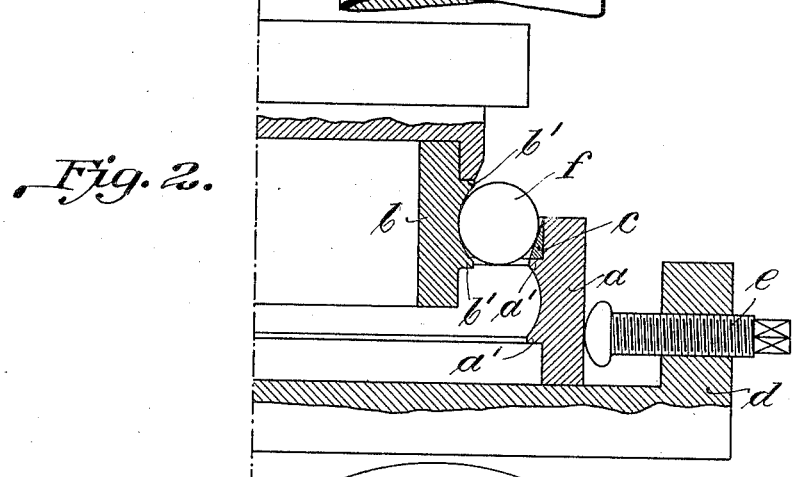
Figure 3:
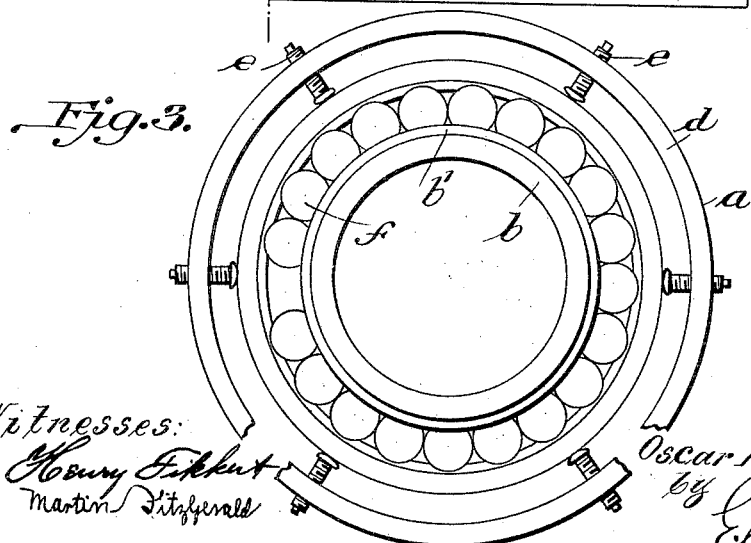

Figure 1 is a transverse section through the bearing. Fig. 2 is a half sectional view showing the method of fitting the balls in position. Fig. 3 is a plan of the apparatus with the pressure cap removed.

On the drawings $a$ and $b$ designate the two rings of the bearing which are of substantially rectangular cross section. The inner faces of said rings are provided with laterally projecting ribs $a'$ $b'$ respectively.

In order to insert the balls $f$ in position, the ring $a$ is chucked by means of clamping screws $e$ within a rotatable chuck $d$, and a ring $c$ of triangular cross section is inserted in the ring $a$ so as to rest upon the upper projecting rib $a'$ and thus constitute a gradient surface over which the balls $f$ may be rolled. The balls $f$ are set in position between the inner ring $b$ and the gradient surface $c$ as indicated in Fig. 2, and the chuck $d$ is then rapidly rotated while at the same time pressure is applied to the inner ring $b$ by means of a pressure head $g$ whereupon the balls roll upon the surface $c$ into position between the rings $a$ and $b$.

I claim:—

1. The method of inserting the balls in a ball bearing having two race-rings each provided with two projecting ribs on their opposing faces, which consists in fitting an annular wedge upon one rib of one of said rings, in inserting the balls between said wedge and the ribs of the other ring, in rotating one of said rings, and in simultaneously forcing the rings into alinement.

2. The method of inserting the balls in a ball bearing having two race-rings each provided with two projecting ribs on their opposing faces, which consists in fitting an annular wedge upon one rib of one of said rings, in inserting the balls between said wedge and the ribs of the other ring, in rotating the ring carrying said wedge and in simultaneously forcing the stationary ring into alinement with the rotating ring.

3. The method of inserting the balls in a ball bearing having inner and outer race-rings each provided with two projecting ribs on their opposing faces, which consists in fitting an annular wedge upon one rib of said outer ring, in inserting the balls between said wedge and the ribs of said inner ring, in rotating said outer ring and in simultaneously forcing said inner ring into position within said outer ring.

In witness whereof I have hereunto set my hand in the presence of two witnesses.

OSCAR HOFFMANN. [L. S.]

Witnesses:
 HELEN NUFER,
 ALBERT NUFER.

---

Copies of this patent may be obtained for five cents each, by addressing the "Commissioner of Patents, Washington, D. C."